(12) United States Patent
Ahlning

(10) Patent No.: US 11,148,602 B2
(45) Date of Patent: Oct. 19, 2021

(54) RECONFIGURABLE PASSENGER SEAT ASSEMBLY OF A VEHICLE

(71) Applicant: Volvo Car Corporation, Gothenburg (SE)

(72) Inventor: Leif Ahlning, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/822,058

(22) Filed: Mar. 18, 2020

(65) Prior Publication Data

US 2020/0317137 A1    Oct. 8, 2020

Related U.S. Application Data

(60) Provisional application No. 62/829,704, filed on Apr. 5, 2019.

(51) Int. Cl.
*B60R 7/04* (2006.01)
*B60N 2/01* (2006.01)
*B60N 2/30* (2006.01)

(52) U.S. Cl.
CPC .............. *B60R 7/043* (2013.01); *B60N 2/01* (2013.01); *B60N 2/3086* (2013.01)

(58) Field of Classification Search
CPC .......... B60R 7/043; B60N 2/01; B60N 2/3086
USPC ....................................................... 297/236
See application file for complete search history.

(56) References Cited

U.S. PATENT DOCUMENTS

| | | |
|---|---|---|
| 4,938,439 A | 7/1990 | Fried et al. |
| 6,386,629 B1 | 5/2002 | Severinski et al. |
| 8,011,714 B2 * | 9/2011 | Parkinson ............ B60N 2/3077 296/65.03 |
| 9,156,407 B1 | 10/2015 | Kramer et al. |
| 10,076,986 B2 | 9/2018 | Clark et al. |
| 2003/0098589 A1 | 5/2003 | Wikman et al. |
| 2010/0102585 A1 * | 4/2010 | Kato ........................ B60N 2/22 296/24.34 |
| 2010/0156128 A1 | 6/2010 | Dexter et al. |

(Continued)

FOREIGN PATENT DOCUMENTS

| | | |
|---|---|---|
| DE | 20060059969 A1 | 3/2008 |
| JP | H08127279 A | 5/1996 |
| JP | 2006123583 A | 5/2006 |

OTHER PUBLICATIONS

Jul. 14, 2020 European Search Report issued on International Application No. 20164803.

*Primary Examiner* — Mark R Wendell
(74) *Attorney, Agent, or Firm* — Clements Bernard Walker; Christopher L. Bernard

(57) ABSTRACT

Passenger assemblies for installation in a passenger cabin of a vehicle are provided. In one implementation, a reconfigurable assembly is adapted to be incorporated in a vehicle, the reconfigurable assembly including at least a base member fixed within a row of passenger seats of the vehicle. The base member includes one or more attachment members. The reconfigurable assembly further includes a seat unit including a frame having one or more attachment members adapted for removable attachment with the one or more attachment members of the base member. Also, the reconfigurable assembly includes a console unit including a frame having one or more attachment members adapted for removable attachment with the one or more attachment members of the base member.

19 Claims, 12 Drawing Sheets

(56) References Cited

U.S. PATENT DOCUMENTS

2013/0062903 A1\* 3/2013 Mather ................ B60N 2/3031
296/64
2017/0036572 A1 2/2017 Hansen et al.
2020/0290517 A1\* 9/2020 Sabdad .................. B60R 11/00

\* cited by examiner

RECONFIGURABLE PASSENGER SEAT ASSEMBLY OF A VEHICLE

CROSS-REFERENCE TO RELATED APPLICATION

The present disclosure claims the benefit of priority of U.S. Provisional Patent Application No. 62/829,704, filed on Apr. 5, 2019, and entitled "RECONFIGURABLE PASSENGER SEAT ASSEMBLY OF A VEHICLE," the contents of which are incorporated in full by reference herein.

TECHNICAL FIELD

The present disclosure is generally directed to the automotive field. More particularly, the present disclosure relates to assemblies that are adapted for use by passengers within a vehicle. The assemblies can include multiple parts and may be configured as a passenger seat in a first mode and can be reconfigured for other uses in a second mode.

BACKGROUND

Generally, various types of vehicles are designed to include many different styles and sizes, depending on various uses. For example, compact vehicles are typically designed to transport up to two or four passengers, whereby sedans may be designed to transport up to five passengers. Larger vehicles, such as minivans and sport utility vehicles, may be designed to transport up to six, seven, or more passengers. Other sizes and configurations of vehicles may be designed with the intention of allowing the transport of various numbers of passengers.

With some vehicle sizes or styles, such as sedans, there may be certain times when the vehicle owner may wish to transport up to a maximum of four passengers on a regular basis. However, at other times, the owner of the sedan may have a need, either temporarily or for an extended amount of time, to transport as many as five passengers. During the times when only four passenger spaces are needed, extra space within the vehicle may go unused.

Therefore, there is a need in the field of automobile design to better utilize the interior spaces of a vehicle to allow the passengers to reconfigure the vehicle to accommodate different numbers of passengers.

SUMMARY

Accordingly, the present disclosure includes a reconfigurable assembly comprising a base member fixed within a row of passenger seats of a vehicle, where the base member may have one or more attachment members. The reconfigurable assembly may further include a seat unit including a frame having one or more attachment members adapted for removable attachment with the one or more attachment members of the base member. Also, a console unit of the reconfigurable assembly may include a frame having one or more attachment members adapted for removable attachment with the one or more attachment members of the base member. For example, the console unit may be used for various purposes when an extra passenger seat is not needed.

According to another embodiment, a vehicle is provided such that the vehicle may be adapted to include a passenger cabin having at least one row of passenger seats and a base member fixed within one row of the at least one row of passenger seats. The base member is configured to include one or more attachment members. The vehicle may also include a seat unit including a frame having one or more attachment members adapted for removable attachment with the one or more attachment members of the base member. A console unit may further include a frame having one or more attachment members adapted for removable attachment with the one or more attachment members of the base member. Thus, the vehicle may have the flexibility to accommodate a different number of passengers when configured in various modes and provide features of the console unit for the passengers in another mode.

BRIEF DESCRIPTION OF THE DRAWINGS

The present disclosure is directed to various embodiments illustrated and described herein with reference to the various drawings, in which like reference numbers are used to denote like system or assembly components/methods or algorithm steps. The illustrated components of the various systems are not necessarily drawn to scale.

DESCRIPTION OF EMBODIMENTS

According to the present disclosure, reconfigurable assemblies having multiple functions are provided for use in a vehicle. The reconfigurable, multi-purpose assemblies include a first removably attachable part that is adapted as an extra seat that can be installed within a row of passenger seats in the vehicle. Also, a second removably attachable part is adapted as a console device that may have similarities to a center console that is typically positioned in between the two front seats of a vehicle. As such, the reconfigurable, multi-purpose assembly can be arranged to provide an extra seat if an extra passenger position is needed in the vehicle and can alternatively be arranged to provide a useful console device for adjacent passengers within the vehicle when the extra passenger position is not needed.

With the reconfigurable, multi-purpose assembly described in the present disclosure, a vehicle that may normally be configured as a five-passenger vehicle, for example, may be adapted to utilize the reconfigurable assembly according to passenger needs. In one mode, the assembly can be used as a fifth seat in a space between two back seat spaces of the vehicle to transport up to five passengers. In another mode, the assembly can be used to replace the fifth seat with a console unit if fewer than five passenger spaces are needed.

If four or fewer passengers are intending to ride in the vehicle, the reconfigurable, multi-purpose assembly may be reconfigured by attaching one of any number of possible console units, thereby converting the five-passenger vehicle into a four-passenger vehicle while providing extra features for the passengers, particularly the passengers adjacent to the space where the fifth seat would normally be positioned. Thus, the passengers in the two back seats can use one or more console units in a variety of ways, depending on the design and features included in the console units. For example, the console units may include, among other things, an arm rest, storage compartments, beverage holding compartments, cup/bottle/can holders, supporting devices for holding a small platform/game board/tablet etc., waste/trash compartments, charging station, heating elements, cooling elements, accent lighting elements, electrical outlets for powering various electronics, and/or other features and uses as described in the present disclosure and according to particular features that may be included in the console units.

Figure 1:
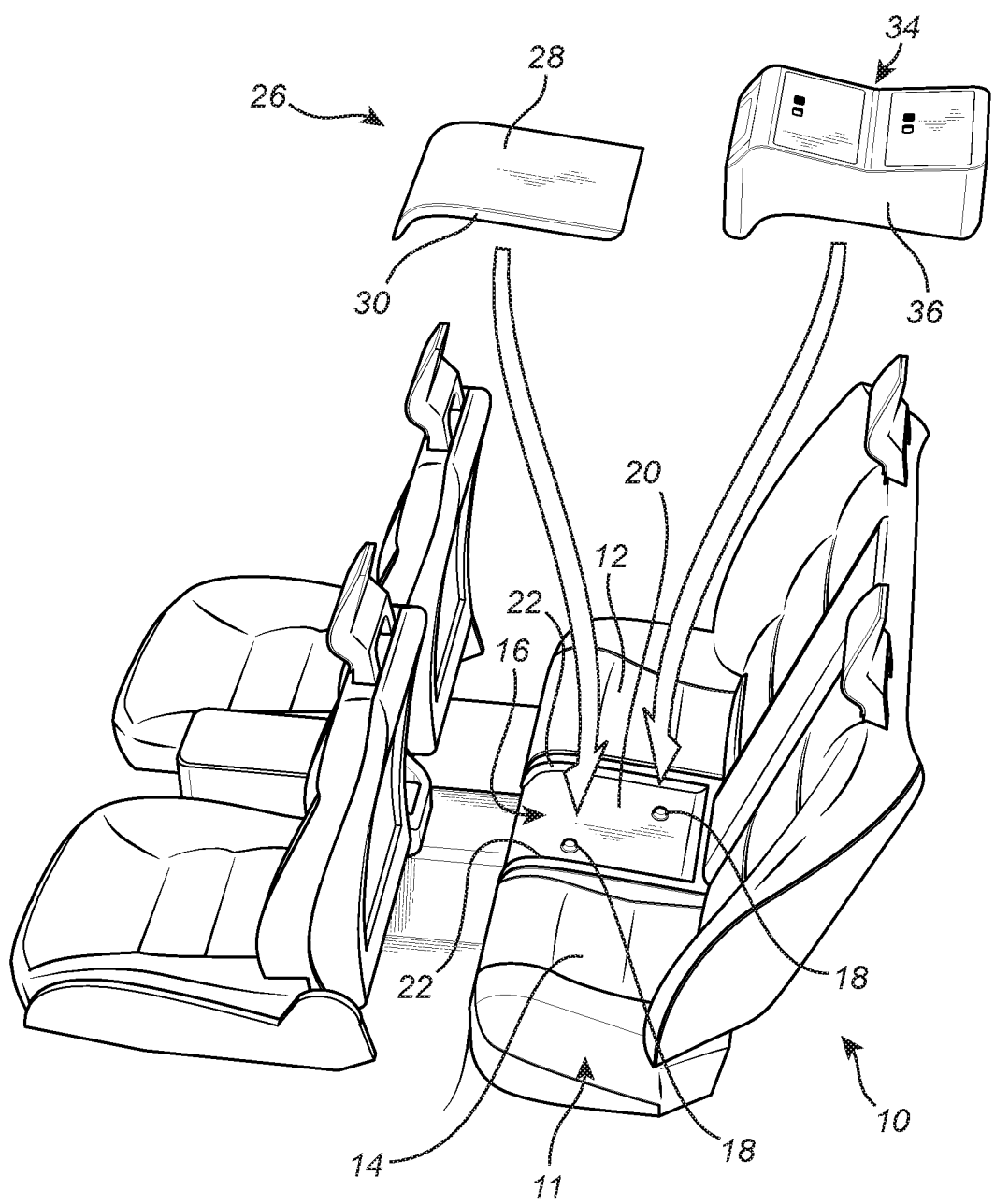
FIG. 1 is a diagram showing a perspective view of a reconfigurable assembly utilized in a row of passenger seats of a vehicle, according to various embodiments of the present disclosure.

FIG. 1 illustrates a perspective view of a reconfigurable assembly 10 incorporated in and/or attachable to a row of passenger seats 11 (or bench seat) of a vehicle. In this embodiment, the row of passenger seats 11 includes not only a right seat 12 and a left seat 14, but also includes a base member 16 that is part of the reconfigurable assembly 10. According to some embodiments, the base member 16 may be incorporated into a bench seating component of the vehicle. The base member 16 may be connected to or fixedly supported by the vehicle, such as by attaching the base member 16 to the row of passenger seats 11 or attaching the base member 16 to brace elements that are used for fixing the row of passenger seats 11 to the vehicle. In some implementations, the base member 16 may have a fixed position with respect to the vehicle.

The base member 16 may include any suitable type of connection or attachment elements for allowing one or more interchangeable units to be removably attached thereto. For example, the base member 16 may include one or more attachment member 18. As illustrated in the embodiment shown in FIG. 1, the base member 16 include two attachment members 18 configured as protuberances, projections, or bulges that extend upward from a surface 20 of the base member 16. These protuberances may have any suitable shape, such as a substantially cylindrical or frustoconical shape adapted for a press-fit connection with corresponding openings in one or more removable, interchangeable units, as described below.

The attachment members 18, according to other embodiments, may include any suitable components for enabling removable connection. For example, the attachment members 18 may include screws and/or screw holes, snaps, buckles, latches, press-fit components, hooks, locks, clips, or other types of connectors, attachments, or fasteners for attaching the interchangeable units to the base member 16. Accordingly, the interchangeable units may also include matching connectors, attachments, or fasteners to enable connection with the base member 16.

In addition, the base member 16 may also include side walls 22 that may also act as press-fit components. As such, corresponding outer walls of the one or more removable, interchangeable units (e.g., units 26, 34) may also be configured with similar dimensions as the inner dimensions of the side walls 22 for press-fit connection with the side walls 22.

According to the various implementations of the present disclosure, the reconfigurable assembly 10 of FIG. 1 further includes a removably attachable seat unit 26, which may be adapted for attachment with the base member 16 of the reconfigurable assembly 10. In this respect, the base member 16 and seat unit 26 may comprise two parts of the reconfigurable assembly 10, whereby the seat unit 26 can be attached to the base member 16 to act as a middle seat between the right seat 12 and left seat 14. When the extra seat is not needed (e.g., for transporting a fifth person), the seat unit 26 can be removed from the base member 16.

The seat unit 26 may include a seat cushion 28 and a frame 30. In some embodiments, the seat cushion 28 may include at least an inner padding and an outer skin. The inner padding may include any suitable materials to provide a cushioning effect and to provide comfort for the passenger. The outer skin may also include any suitable material, such as leather, fabric, vinyl, etc. The inner padding and outer skin of the seat cushion 28 may include the same materials used for the right seat 12 and left seat 14 to match the look and feel of these seats 12, 14. The frame 30 may include outer walls configured to be press-fit with the side walls 22 of the base member 16 when the seat unit 26 is connected to the base member 16.

To attach the removably attachable seat unit 26 to the base member 16, the seat unit 26 may include one or more attachment members (not shown) on a bottom portion of the frame 30. The attachment members of the seat unit 26 may be adapted to be compatible with the corresponding attachment members 18 of the base member 16. For example, in the embodiment where the attachment members 18 are configured as protuberances, the corresponding attachment members of the seat unit 26 may include a first set of openings that correspond to the dimensions and positions of the attachment members 18 of the base member 16. Thus, the protuberances 18 may have outer surface dimensions that correspond to inner surface dimensions of the first set of openings of the seat unit 26 to enable a press-fit connection. As such, the seat unit 26 can be pressed downward to press-fit the attachment members and outer walls of the seat unit 26 with the attachment members 18 and side walls 22 of the base member 16 to join the pieces together.

Furthermore, according to various implementations of the present disclosure, the reconfigurable assembly 10 includes a console unit 34 also adapted for removable attachment with the base member 16 shown in FIG. 1. According to some embodiments, only one of the units (i.e., the seat unit 26 and the console unit 34) can be connected to the base member 16 at one time, but in other embodiments, the reconfigurable assembly 10 may be adapted to allow connection of both units 26, 34.

In some embodiments, the reconfigurable assembly 10 described in the present disclosure may include two parts comprising only the base member 16 and the console unit 34. For example, the console unit 34 can be attached to the base member 16 to act as a center console between the right seat 12 and left seat 14. In other embodiments, however, the reconfigurable assembly 10 includes three parts (e.g., the base member 16, the seat unit 26, and the console unit 34) for reconfigurable arrangement in two modes (i.e., a seating mode to provide an extra seat and a utility mode to provide console features for adjacent passengers). In this respect, the seat unit 26 and console unit 34 can be interchangeable and can be used according to the various needs of the passengers. When an extra seat is not needed (e.g., for transporting a fifth person), the seat unit 26 can be removed from the base member 16 and the console unit 34 can be attached.

The console unit 34, as described in more detail below, may include any number of features, designs, sizes, shapes, etc. For example, the console unit 34 may be configured for one or more purposes, such as for use as an arm rest, a storage compartment, a beverage holder, a waste compartment, or other various functions.

To attach the removably attachable console unit 34 to the base member 16, the console unit 34 includes a frame 36 that may include one or more attachment members (not shown) on a bottom portion thereof, similar to the attachment members on the frame 30 of the seat unit 26. The attachment members of the console unit 34 may be adapted to be compatible with the corresponding attachment members 18 of the base member 16. For example, in the embodiment where the attachment members 18 are configured as protuberances, the corresponding attachment members on the underside of the frame 36 of the console unit 34 may include a second set of openings that correspond to the dimensions and positions of the attachment members 18 of the base member 16. Thus, the protuberances may have outer surface dimensions that correspond to inner surface dimensions of the second set of openings of the console unit 34.

Figure 2:
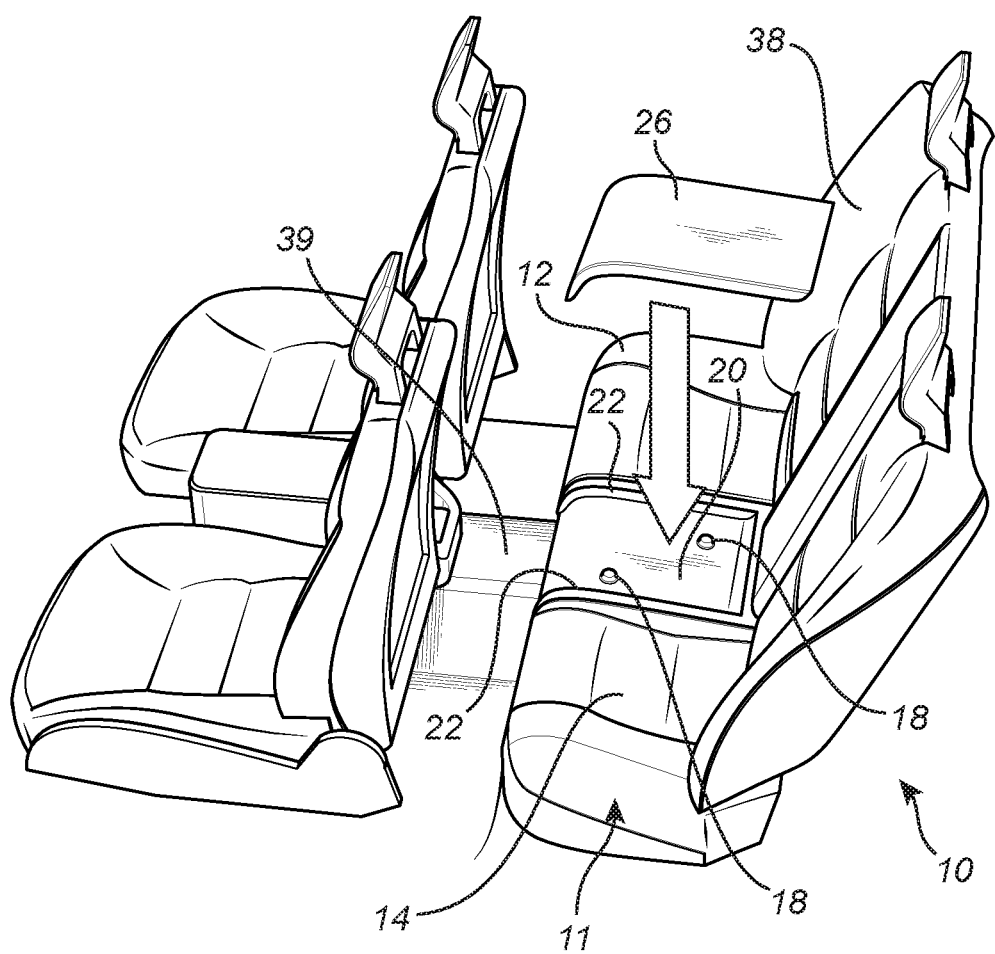
FIG. 2 is a diagram showing a perspective view of a removably attachable seat unit arranged for attachment with a base member of the reconfigurable assembly of FIG. 1, according to various embodiments.

FIG. 2 illustrates a perspective view of the removably attachable seat unit 26 arranged in a position that allows the seat unit 24 to be attached to the base member 16 of the reconfigurable assembly 10. For connection, the seat unit 26 can be pressed downward on the base member 16 such that the attachment members of the seat unit 26 can be aligned with and connected to the attachment members 18 of the base member 16. If configured as protuberances and openings, according to some embodiments described above, the attachment members of the seat unit 26 and base member 16 can be press-fit together. The press-fit attachment may provide adequate support to keep the seat unit 26 securely on the base member 16, but may still allow the seat unit 26 to be easily removed by a passenger when the extra seat is not needed.

In some embodiments, the reconfigurable assembly 10 may be configured such that the openings in the bottom of the seat unit 24 can be used according to a first purpose for attachment with the attachment members 18 of the base member 16, as discussed above. In addition, when removed from the base member 16, the seat unit 24 may be adapted to be used by a passenger as a lap tray, such as by flipping the seat unit 24 upside down. Thus, in some embodiments, the openings, normally used for attachment, may have the additional function of acting as one or more cup holders or bottle holders. If other types of attachment members are used in the reconfigurable assembly 10, the bottom surface of the seat unit 24 may serve as a writing platform, white board, book rest, etc.

As shown in FIG. 2 and as mentioned above, the seat unit 26 may be fastened to the base member 16 or completely removed from the base member 16. However, according to alternative embodiments, the reconfigurable assembly 10 may be configured such that the seat unit 26 is not completely removable from the reconfigurable assembly 10, but instead may be attached to the reconfigurable assembly 10 by various elements to allow the seat unit 26 to be moved out of the way when not in use as a passenger seat. For example, the seat unit 26 may be connected to the base member 16 by one or more hinges that may allow the seat unit 26 to be pivoted. In this respect, the base member 16 and seat unit 26 may include hinges at a back portion thereof with respect to the direction of the vehicle (i.e., toward a right side of FIG. 2). Therefore, the seat unit 26 can be folded back against a back rest 38 at a middle seat position of the row of passenger seats 11. Alternatively, hinges may be attached to front portions of the base member 16 and seat unit 26 to thereby allow the seat unit 26 to be folded down over the hump 39 at the foot of the passenger cabin. When folded down over the hump 39, the underside of the seat unit 26 may include features (e.g., cup holding elements) that may be used by the passengers. According to yet another embodiment, the seat unit 26 may be slidably attached to the base member 16, whereby the seat unit 26 can be slid into place over the base member 16 for use as a passenger seat or can be slid out of the way (e.g., backward into the trunk of the vehicle) when not in use.

Figure 3:
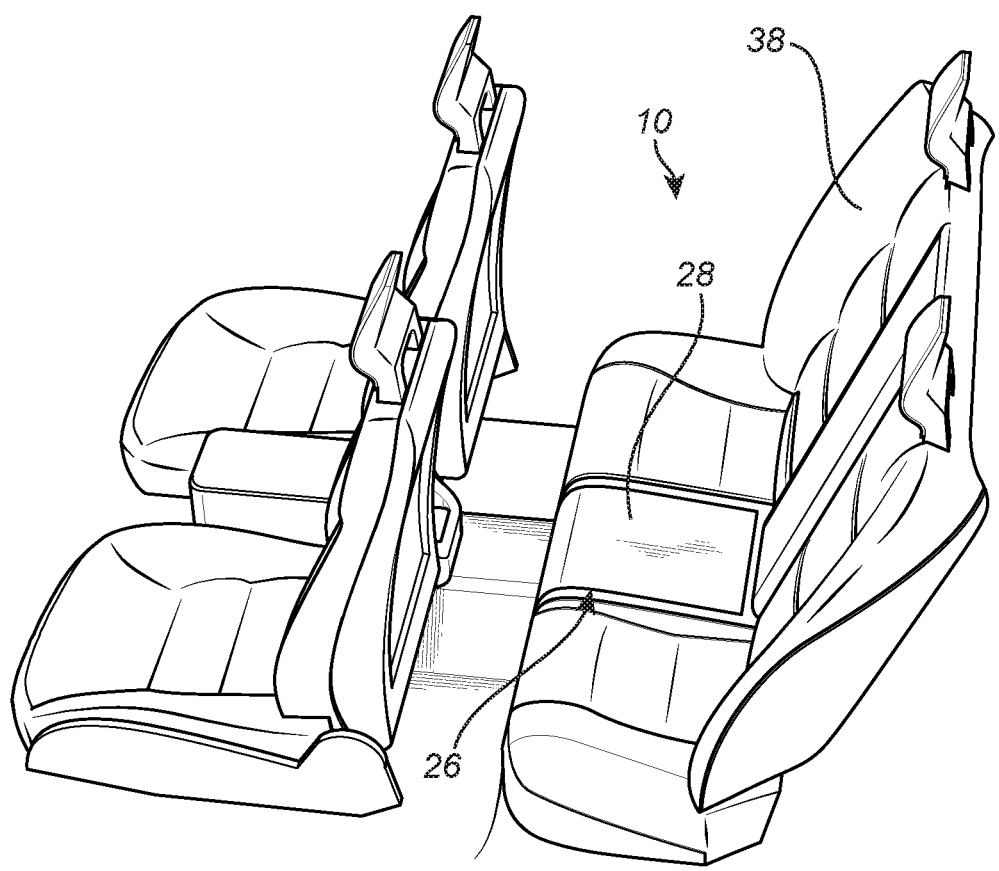
FIG. 3 is a diagram showing a perspective view of the seat unit attached with the base member in a first mode of the reconfigurable assembly of FIG. 1, according to various embodiments.

FIG. 3 illustrates the reconfigurable assembly 10 shown with the seat unit 26 attached with the base member 16. This attached arrangement shows the reconfigurable assembly 10 in a first mode (e.g., a seating mode), whereby an extra seat is provided for an extra passenger. For example, in an embodiment in which the vehicle is a sedan, the extra seat may provide a fifth seat for enabling up to five passengers to be transported in the vehicle.

The vehicle may further include additional components to allow a passenger to ride in the extra seat when the reconfigurable assembly 10 is arranged in the seating mode. For example, an additional set of seat belts may be provided in the vehicle to allow the passenger in the extra seat to be buckled in properly in accordance with various traffic laws. In some embodiments, the additional seat belt may include a waist strap that is positioned across the pelvis area of the passenger and may also include a chest strap that is positioned across the chest of the passenger. Additionally, according to some embodiments, the vehicle may further be equipped with an additional head rest extending up from a top portion of the back rest 38 at the extra seat position.

A vehicle comprising the reconfigurable assembly 10 may include additional features. For example, in some embodiments, a back portion of the right, center, and left seats may be formed as one piece and can therefore be folded down as one unit to open up the space of the passenger cabin to the trunk space. Alternatively, the back portions of the right, center, and left seats may be formed as individual pieces that can be separately folded down for opening up smaller areas of the passenger cabin to the trunk space.

Figure 4:
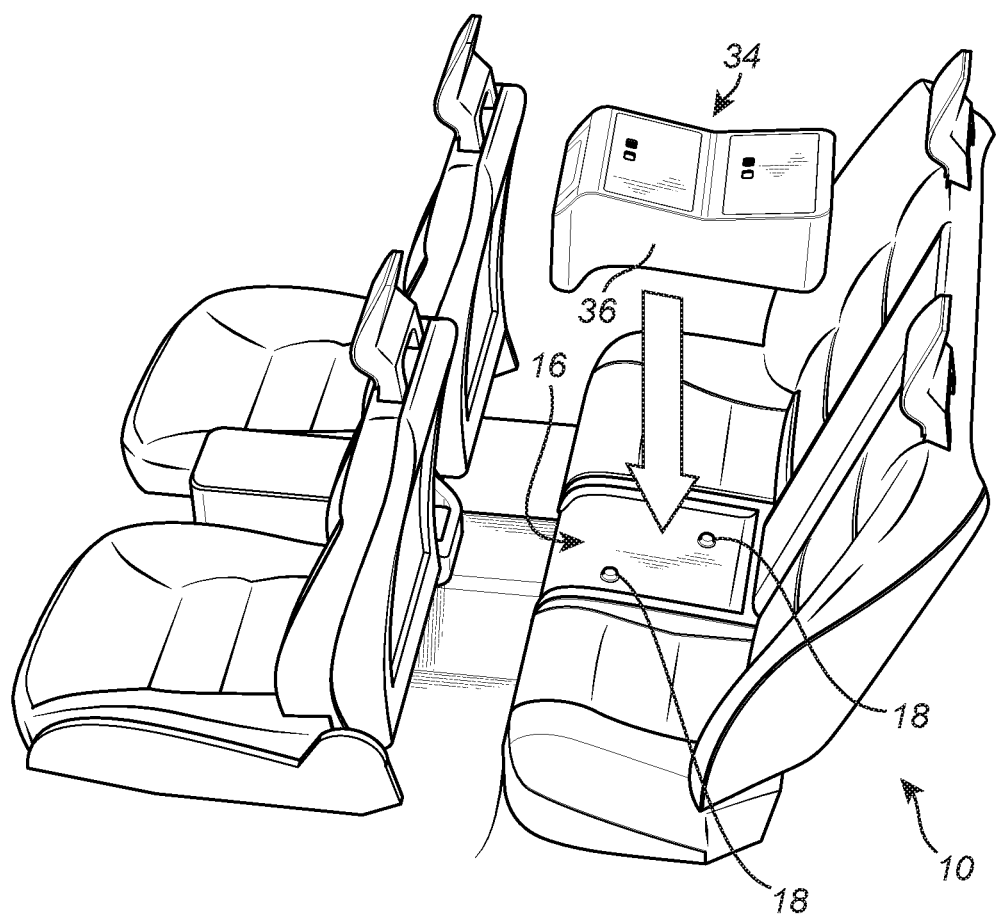
FIG. 4 is a diagram showing a perspective view of a removably attachable console unit arranged for attachment with the base member of the reconfigurable assembly of FIG. 1, according to various embodiments.

FIG. 4 illustrates a perspective view of the removably attachable console unit 34 arranged in a position that allows the console unit 34 to be attached to the base member 16 of the reconfigurable assembly 10. For connection, the console unit 34 can be pressed downward on the base member 16 such that the attachment members of the console unit 34 can be aligned with and connected to the attachment members 18 of the base member 16. If configured as protuberances and openings, as suggested above, the attachment members of the console unit 34 and base member 16 can be press-fit together. The press-fit attachment may provide adequate support to keep the console unit 34 on the base member 16, but still allows the console unit 34 to be easily removed by a passenger when the console unit 34 is not needed or if the extra seat (e.g., the seat unit 26) is to be attached. When removed, the console unit 34 may be stored in a trunk, frunk, or other storage area of the vehicle.

Figure 5:
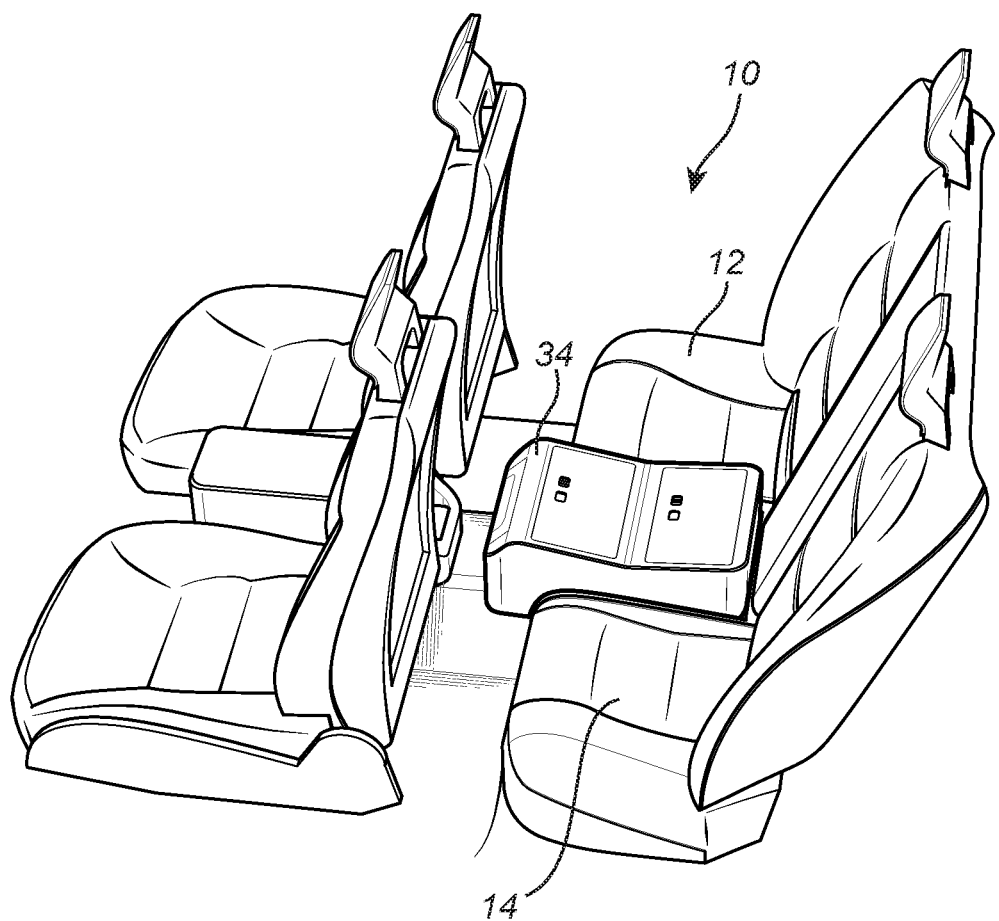
FIG. 5 is a diagram showing a perspective view of the console unit attached with the base member in a second mode of the reconfigurable assembly of FIG. 1, according to various embodiments.

FIG. 5 illustrates a perspective view of the console unit 34 attached with the base member 16. This arrangement can be considered to be a second mode or utility mode of the reconfigurable assembly 10. When installed, the console unit 34 can serve various functions, depending on the various possible configurations of the console unit 34. For example, the console unit 34 may include features for allowing a passenger to store items, for providing an arm rest for the passengers, for holding certain components in a desired position for use by the passengers, for heating food items, for cooling beverages, for charging an electrically rechargeable device, and/or other various functions.

In the example of a sedan that may have space for five people, if the owner typically uses the sedan to transport four or fewer people, the console unit 34 may be connected to place the reconfigurable assembly 10 in the second mode (i.e., utility mode), thereby allowing the passengers, particularly those in the back seats 12, 14, to utilize the various features of the console unit 34.

An automobile manufacturing company may create various types of console units that may be sold separately. Thus, a buyer may have a choice to purchase one or more console units according to the buyer's needs and/or preferences. For example, if the automobile manufacturing company creates a certain type of console unit that uses electrical power (e.g., a refrigeration device), the buyer may opt to purchase a vehicle having an electrical connection feature on the base member 16 for providing power to a particular console unit having a compatible electrical connection. Also, the console unit may include electrical circuitry or components (e.g., a refrigeration device) incorporated therein. Other options and configurations of console units are meant to be part of the present disclosure, including, without limitation, the examples discussed below with respect to FIGS. 7-16.

Figure 6:
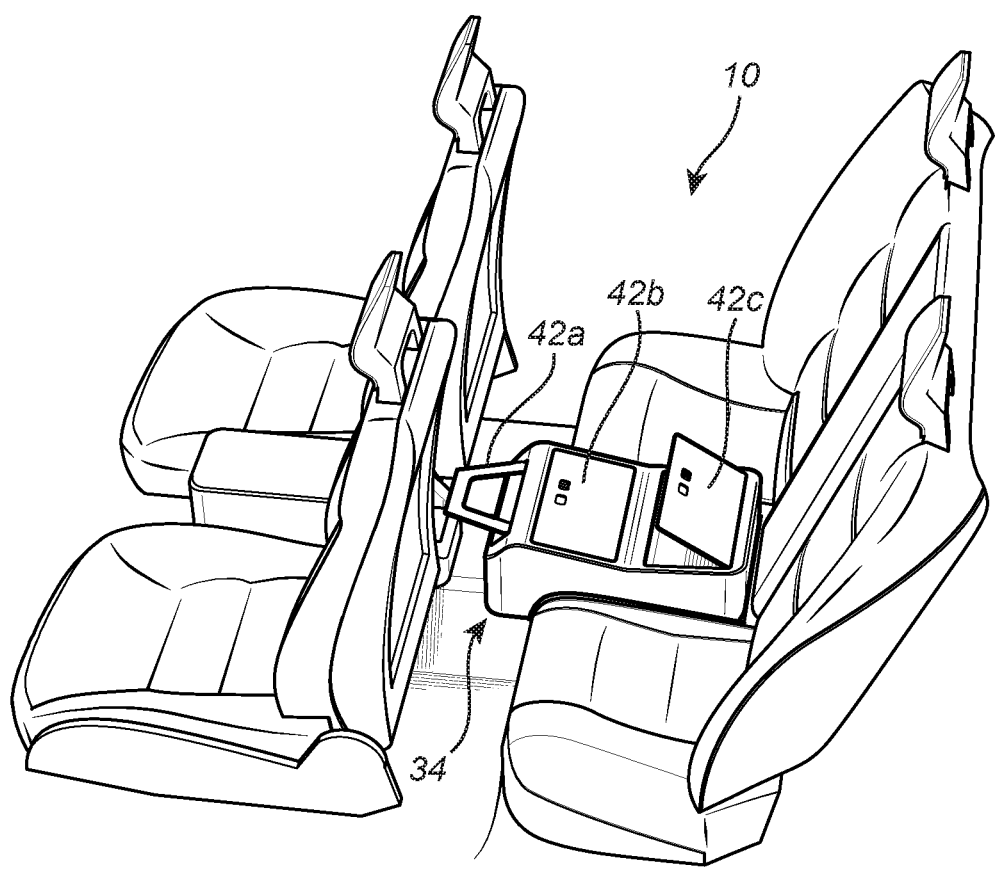
FIG. 6 is a diagram showing a perspective view of the console unit attached to the base member as shown in FIG. 5 with some of the covers of the console unit arranged in an opened position, according to various embodiments.

FIG. 6 illustrates a perspective view of the console unit 34 attached to the base member 16 with some of the covers 42a, 42b, 42c of the console unit 34 arranged in an opened position. It should be noted that the console unit 34 may include any number, type, size, and/or shape of compartments incorporated therein, and thus any number, type, size, and/or shape of covers 42 may be also incorporated therein to keep and/or protect the contents of the compartments.

In some embodiments, the covers 42a, 42b, 42c may include locks that can be locked or unlocked using a key, combination, or other suitable locking/unlocking feature. Also, the covers 42 may include any suitable type of closing features (e.g., latches, etc.) for allowing a passenger to open/close the covers 42 as needed.

According to some embodiments, the reconfigurable assembly 10 may be configured such that the console unit 34 can be attached to the base member 16 using certain attachment members that may be accessible by opening one or more of the covers 42a, 42b, 42c. For example, a bottom portion of the console unit 34 may include one or more threaded apertures that correspond to threaded apertures in the surface 20 of the base member 16, and screws may be threadedly fastened through the threaded apertures for securing the console unit 34 to the base member 16. Other types of connection components may be used for attaching the console unit 34 to the base member 16 via the covers 42a, 42b, 42c.

Therefore, according to various embodiments of the present disclosure, the reconfigurable assembly 10 may include the base member 16 fixed within a row of passenger seats 11 of a vehicle. The base member 16 may include one or more attachment members 18. The reconfigurable assembly 10 may further comprise the seat unit 26 including the frame 30 having one or more attachment members adapted for removable attachment with the one or more attachment members 18 of the base member 16. Also, the reconfigurable assembly 10 may further comprise the console unit 34, which may include the frame 36 having one or more attachment members adapted for removable attachment with the one or more attachment members 18 of the base member 16.

The attachment members 18 of the base member 16 and the corresponding attachment members of the seat unit 26 and console unit 34 may include protuberances and openings as mentioned above. According to additional embodiments, the associated attachment members may include other types of attachment or connection elements. For example, the one or more attachment members 18 of the base member 16 may instead be configured as one or more screw holes, screws, latches, fasteners, snaps, buckles, hooks, clips, connectors, or locks. Also, the one or more attachment members of the seat unit 26 may include a first set of screws, screw holes, latches, fasteners, snaps, buckles, hooks, clips, connectors, or locks corresponding to the screw holes, screws, latches, fasteners, snaps, buckles, hooks, clips, connectors, or locks of the one or more attachment members 18 of the base member 16. Likewise, the one or more attachment members of the console unit 34 may include a second set of screws, screw holes, latches, fasteners, snaps, buckles, hooks, clips, connectors, or locks corresponding to the screw holes, screws, latches, fasteners, snaps, buckles, hooks, clips, connectors, or locks of the one or more attachment members 18 of the base member 16. In this manner, the seat unit 26 and console unit 34 may be separately attachable to or removable from the base member 16.

Furthermore, the reconfigurable assembly 10 may be adapted for providing electrical power to the console unit 34. For instance, the base member 16 may include an electrical receptacle (not shown) and the console unit 34 may include one or more electrical plugs (not shown) adapted for electrical connection with the electrical receptacle of the base member 16. The console unit 34, in this regard, may include at least one of a touchless or wireless charging device for charging a portable electronic device, a digital gaming connection, an entertainment or video display, a heating element, a cooling element, lighting elements, a voltage converting device, or other suitable electrical devices and/or features. The electrical receptacle of the base member 16 and the one or more electrical plugs of the console unit 34 may include auxiliary port sockets and plugs, USB sockets and plugs, two-prong 120V sockets and plugs, three-prong 120V sockets and plugs, cigarette lighter sockets and plugs, and/or other types or protocols of electrical connectors for allowing electrical power that may be available in the vehicle to be provided to the console unit 34.

Figure 7:
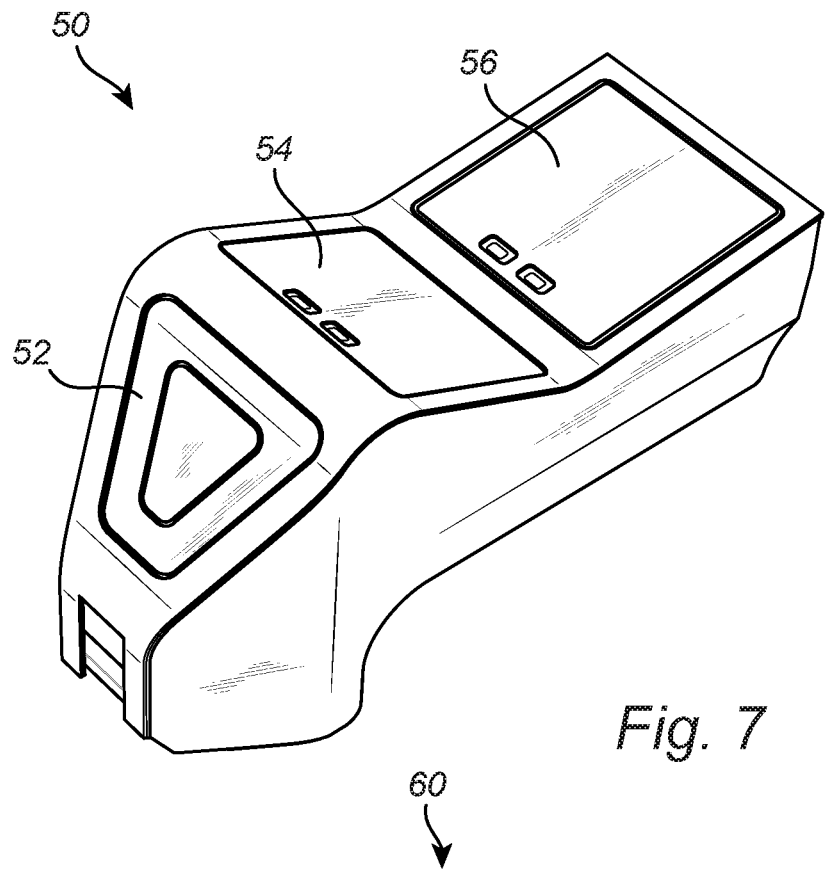
FIG. 7 is a diagram showing a perspective view of a first removably attachable console unit adapted for attachment with the base member of the reconfigurable assembly of FIG. 1, according to various embodiments of the present disclosure.

FIG. 7 illustrates a perspective view of an embodiment of a removably attachable console unit 50 that may be adapted for attachment with the base member 16 of the reconfigurable assembly 10. The removably attachable console unit 50 may be similar to the console unit 34 shown in FIGS. 1 and 4-6. As shown in FIG. 7, the console unit 50 may include a first storage compartment 52, a second storage compartment 54, and a third storage compartment 56, each used for storing a variety of items.

Figure 8:
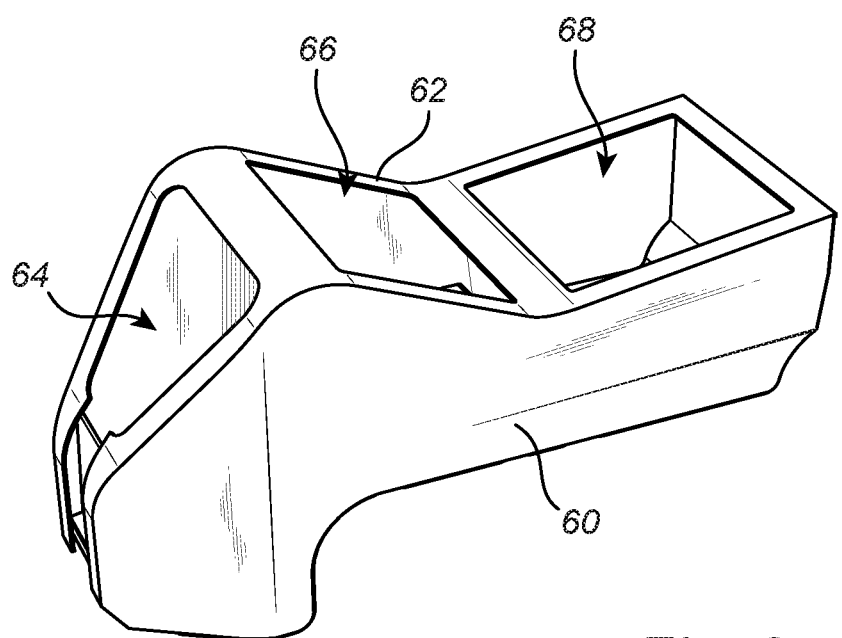
FIG. 8 is a diagram showing a perspective view of a frame of the removably attachable console unit of FIG. 7, according to various embodiments.

FIG. 8 is a diagram showing a perspective view of an embodiment of a frame 60 of the removably attachable console unit 50 of FIG. 7. In this embodiment, the frame 60 includes a brace structure 62 that forms three openings 64, 66, 68, respectively adapted to support the first, second, and third storage compartments 52, 54, 56 shown in FIG. 7. The frame 60, as mentioned above with respect to the similar embodiment of the removably attachable console unit 34, may also include one or more attachment members (not shown) on an underside thereof for attachment/connection with the attachment members 18 of the base member 16.

Figure 9:
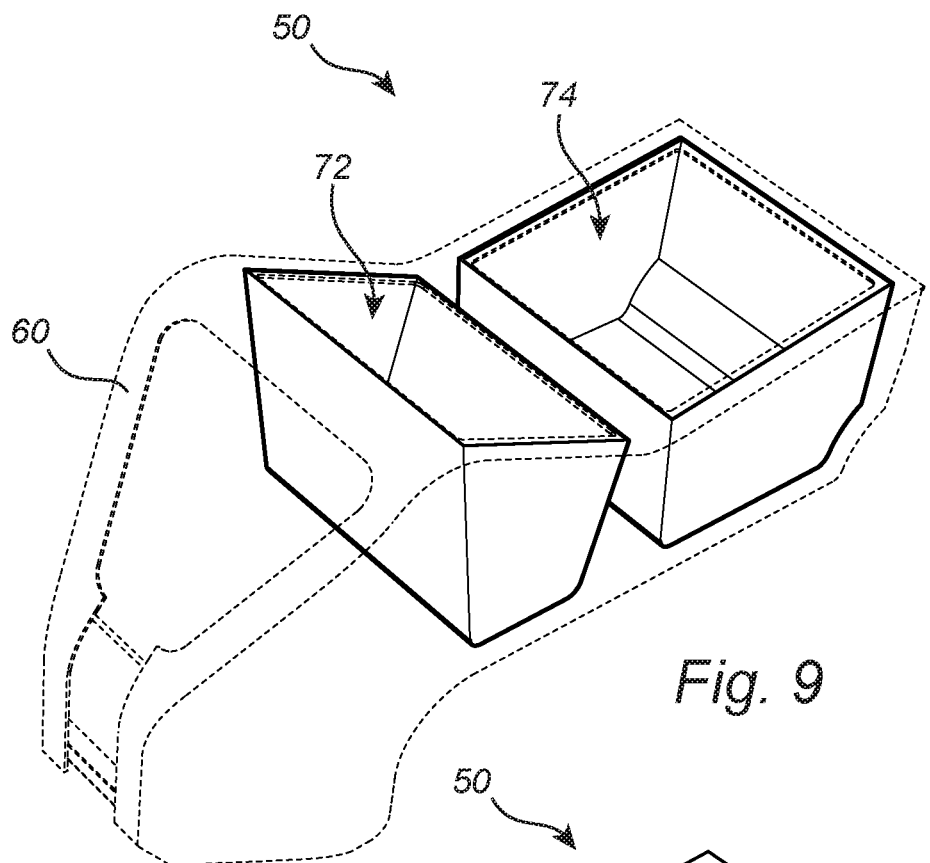
FIG. 9 is a diagram showing a perspective view of a plurality of inserts installed onto the frame of the removably attachable console unit of FIG. 7, according to various embodiments.

FIG. 9 illustrates a perspective view of an embodiment of a plurality of inserts 72, 74 that may be inserted into the frame 60 of the removably attachable console unit 50. For example, a first insert 72 may be adapted to fit within the opening 66 of the frame 50 and a second insert 74 may be adapted to fit within the opening 68 of the frame 50. In some embodiments, another insert may be installed in the opening 64 at a front portion of the console unit 50. The inserts 72, 74, according to various embodiments, may include a plastic material and/or a fabric material. For instance, an inner surface of the inserts 72, 74 may be lined with felt and/or a washable fabric material.

Figure 10:
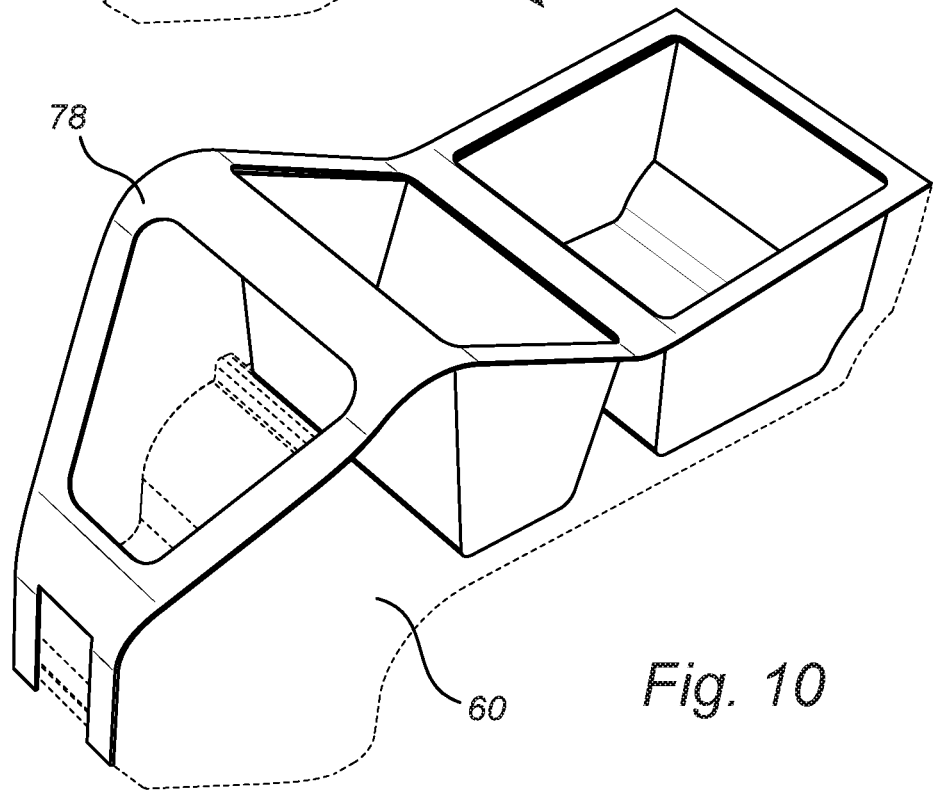
FIG. 10 is a diagram showing a perspective view of trim elements attached to the frame of the removably attachable console unit of FIG. 7, according to various embodiments.

FIG. 10 illustrates a perspective view of an embodiment of a trim element 78 attached to the frame 60 and/or to the inserts 72, 74 of the removably attachable console unit 50. The trim element 78 may include any material or combination of materials and may include any style, color, etc. for providing a finished look to the console unit 50.

Figure 11:
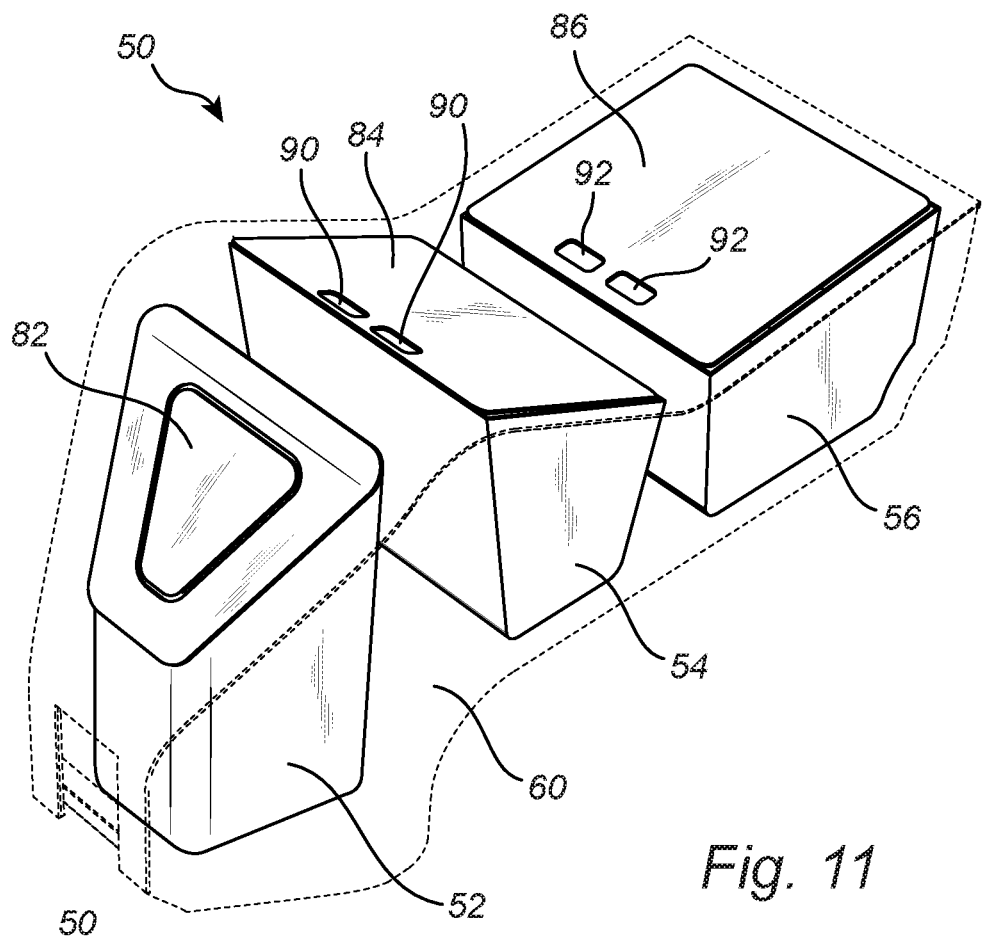
FIG. 11 is a diagram showing a perspective view of covers for the inserts shown in FIG. 9, the covers pivotably attached to the frame of the removably attachable console unit of FIG. 7, according to various embodiments.

FIG. 11 illustrates a perspective view of an embodiment of a plurality of covers 82, 84, 86 for covering the storage compartments 52, 54, 56 shown in FIG. 7. The covers 82, 84, 86 may be pivotably attached to the frame 60, inserts 72, 74, and/or trim element 78 of the removably attachable console unit 50, according to various embodiments. In some embodiments, the second storage compartment 54 may include a cover 84, which may be pivoted with respect to the storage compartment 54 via hinges 90. Likewise, the third storage compartment 56 may include a cover 86, which may be pivoted with respect to the storage compartment 56 via hinges 92. The covers 82, 84, 86 are adapted to allow access to an inside of the one or more inserts and/or storage compartments 52, 54, 56.

Figure 12:
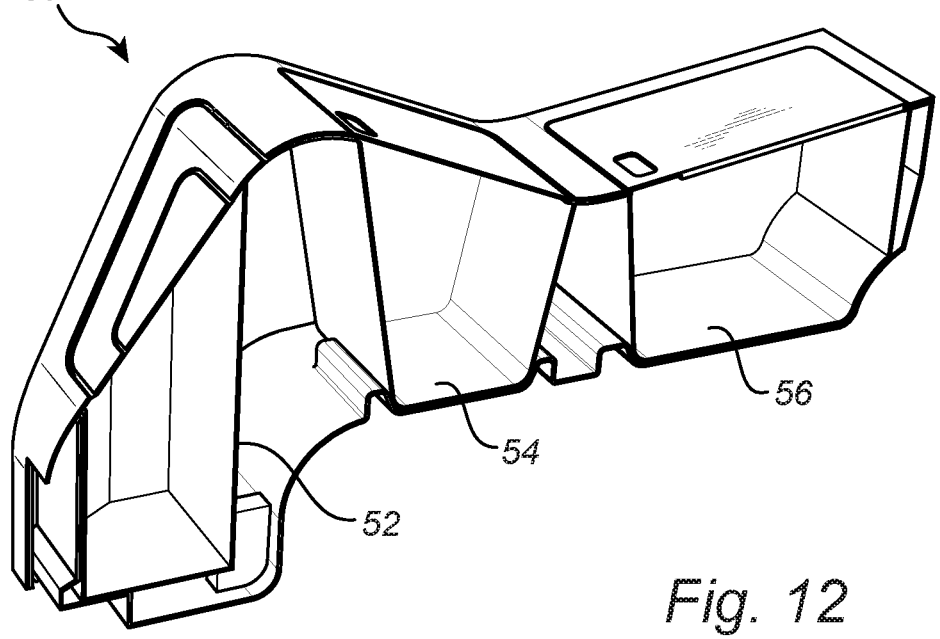
FIG. 12 is a diagram showing a cross-sectional perspective view of the removably attachable console unit of FIG. 7, according to various embodiments.

FIG. 12 is a diagram showing a cross-sectional perspective view of the removably attachable console unit 50 of FIG. 7. Inside portions of the storage compartments 52, 54, 56 are shown.

Figure 13:
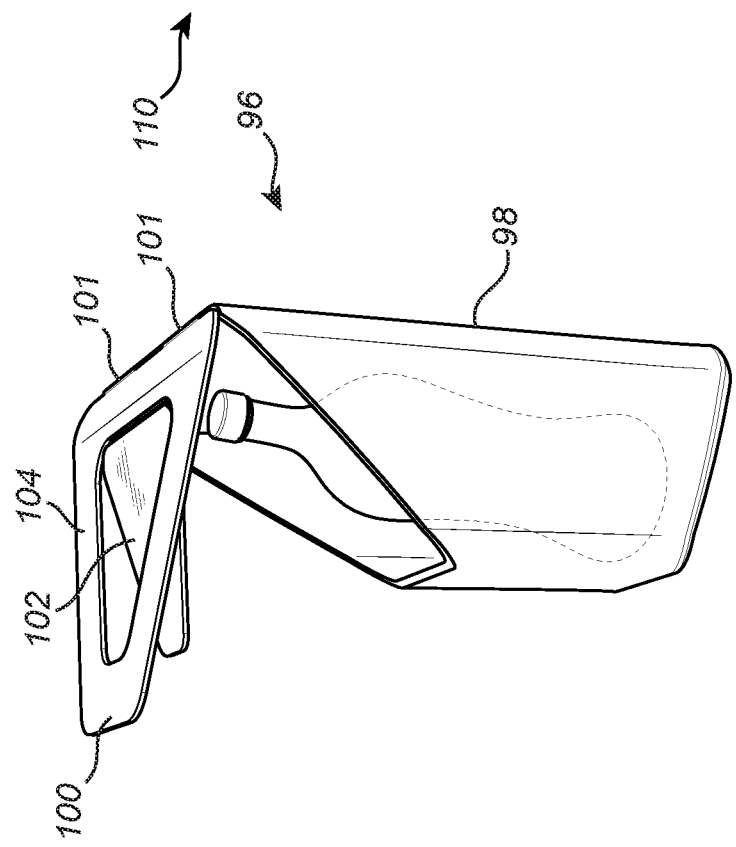
FIG. 13 is a diagram showing a perspective view of a compartment to be incorporated in the removably attachable console unit of FIG. 7, according to various embodiments.

FIG. 13 illustrates a perspective view of an embodiment of a compartment 96 that may be adapted for installation in the removably attachable console unit 50 of FIG. 7 or in any other suitable console unit. The compartment 96 may be similar to the storage compartment 52 shown in FIGS. 7 and 11. The compartment 96 may include a body insert portion 98 adapted to be inserted in the first opening 64 shown in FIG. 8. The body insert portion 98 may be configured as a cup or bottle holder.

The compartment 96 may further include a lid 100 that may be connected to the body insert 98 by one or more hinges 101, allowing access to the interior of body insert portion 98. The lid 100 may be pivoted such that a cup-liner (not shown) in the interior of the body insert portion 98 can be removed. For instance, if liquid (e.g., from spills, melted ice, leaks in bottles or cans, etc.) accumulates in the body insert portion 98, the removable cup-liner can be removed by lifting the lid 100 and pulling the cup-liner from the body insert portion 98.

Additionally, the lid 100 may include a door 102 that is formed inside an opening 104 of the lid 100. The door 102 may operate independently of the lid 100. The door 102 in this embodiment may be used to allow a passenger to store a beverage container or other item. The door 102 can be opened or closed using any suitable locking or latching mechanism. In some embodiments in which electrical power is supplied to the console unit 50, the body insert 98 and/or cup-liner may include refrigeration units for keeping the beverage container at a cool temperature.

Figure 14:
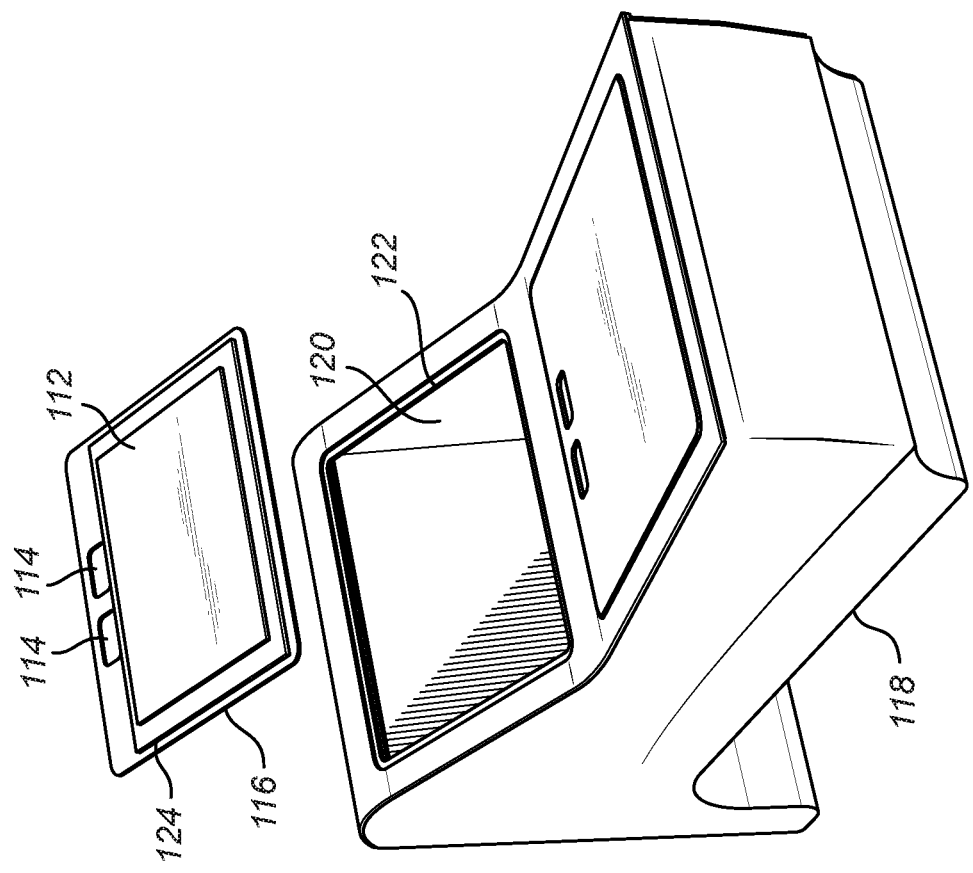
FIG. 14 is a diagram showing a perspective view of a second removably attachable console unit adapted for attachment with the base member of the reconfigurable assembly of FIG. 1, the second removably attachable console unit further adapted for supporting a utility tablet, according to various embodiments.

FIG. 14 illustrates a perspective view of another embodiment of a removably attachable console unit 110. In this embodiment, the console unit 110 may be adapted to support a utility tablet 112, such as a writing platform element. According to some embodiments, the utility tablet 112 may include one or more clips 114 for holding paper, pencils, pens, etc. The clips 114 may also be adapted for holding cardboard containers, paper wrappers, aluminum wrappers, or other containers or wrappers that may normally be associated with holding food items. The utility tablet 112 may also include a channel 116 that extends around an outer edge of the utility tablet 112. The channel 116 may be adapted to collect small food or beverage spills, to hold or store pencils, pens, markers, etc., and/or for other purposes.

The console unit 110 may include a frame 118 that may include one or more attachment members on an underside thereof for connections with the attachment elements 18 of the base member 16, thereby allowing the console unit 110 to be removably attached to the base member 16 as described above. Also, the console unit 110 may include at least one storage compartment, similar to one of the storage compartments 52, 54, 56 described above. In the embodiment shown in FIG. 14, a first storage compartment 120 may be used for storing various items. Also, the storage compartment 120 may include an inner rim 122 adapted to hold the utility tablet 112. The utility tablet 112 may include an outer edge 124 that corresponds to the dimensions and/or connection elements of the inner rim 122 of the frame 118 of the console unit 110 in order to be supported by the frame 118. In various embodiments, the utility tablet 112 may be connected to or removed from the inner rim 12 of the frame 118 of the console unit 110.

Figure 15:
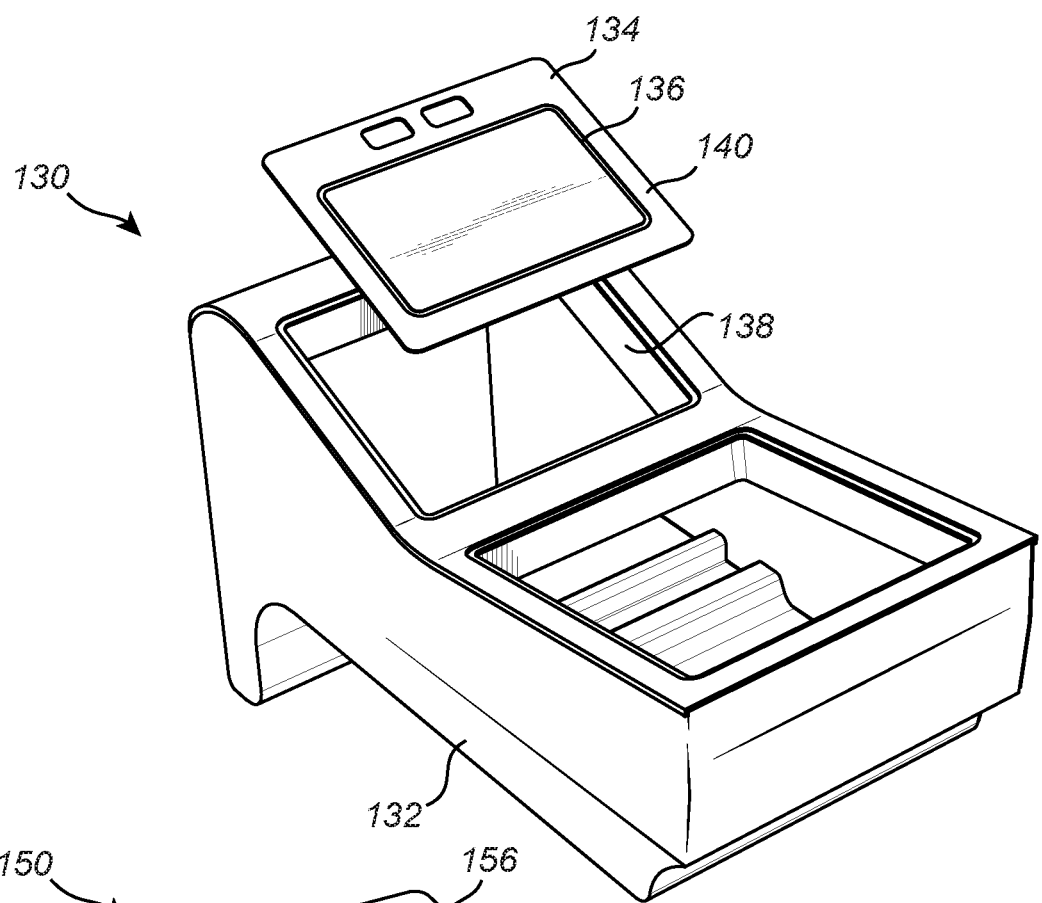
FIG. 15 is a diagram showing a perspective view of a third removably attachable console unit adapted for attachment with the base member of the reconfigurable assembly of FIG. 1, the third removably attachable console unit further adapted for supporting an electronic tablet, according to various embodiments.

FIG. 15 illustrates a perspective view of yet another embodiment of a removably attachable console unit 130 that may be attached to the base member 16 of the reconfigurable assembly 10 of FIG. 1. In this embodiment, the console unit 130 may include a frame 132 having attachment members (not shown) on an underside thereof for removable attachment with the attachment elements 18 of the base member 16. The console unit 130 in this example may be adapted for supporting an electronic tablet 134, which may include similar structure and/or components as the utility tablet 112 shown in FIG. 14. However, the electronic tablet 134 may further include an electronic screen 136 for displaying images and videos to the passengers.

According to this embodiment, the electronic tablet 134 may include electrical connectors (not shown) for connection with corresponding connectors (not shown) on the console unit 130 for receiving electrical power from the vehicle. Similar to the console unit 110 of FIG. 14, the console unit 130 of FIG. 15 may also include an inner rim 138 for supporting and removably holding of the electronic tablet 134 by an outer edge 140 of the electronic tablet 134.

Figure 16:
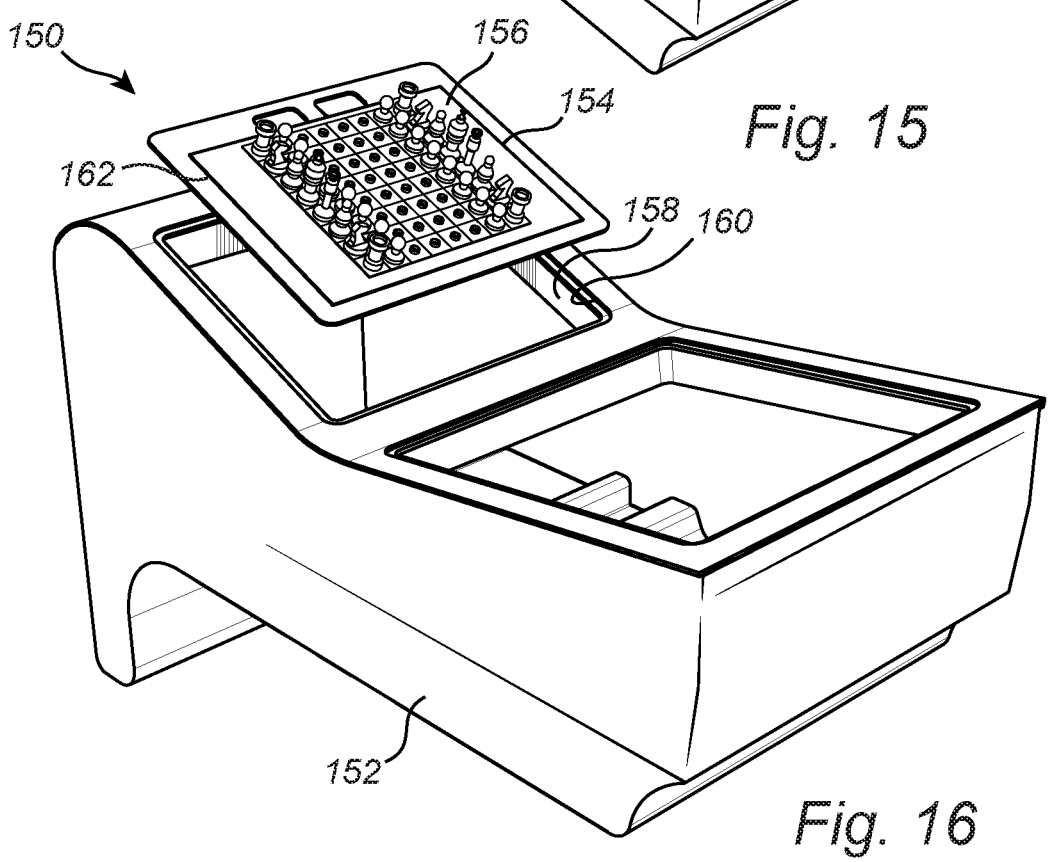
FIG. 16 is a diagram showing a perspective view of a fourth removably attachable console unit adapted for attachment with the base member of the reconfigurable assembly of FIG. 1, the fourth removably attachable console unit further adapted for supporting a game board, according to various embodiments.

FIG. 16 illustrates a perspective view of another embodiment of a removably attachable console unit 150 that may be attached to the base member 16 of the reconfigurable assembly 10 of FIG. 1. In this embodiment, the console unit 150 may include a frame 152 having attachment members (not shown) on an underside thereof for removable attachment with the attachment elements 18 of the base member 16. The console unit 150 in this example may be adapted for supporting a game board 154, such as a chess board, checkers board, backgammon board, or other type of game board according to various embodiments. In some implementations, the game board 154 may include a magnetic surface for allowing magnetic or metal game pieces to remain in place during movement of the vehicle. Alternatively, the game board 154 may include a fabric material (e.g., felt) that may assist in keeping game pieces in place. Also, hook and loop (e.g., Velcro) elements may be used to keep game pieces in place. In some implementations, the game pieces 156 may be stored in a storage compartment 158 when not in use. Also, the storage compartment 158, like the storage compartments shown in FIGS. 14 and 15, may include an inner rim 160 to be aligned with corresponding outer edges 162 of the game board 154 for supporting and securing the game board 154, allowing the game board 154 to be connected to or removed from the console unit 150.

Figure 17:
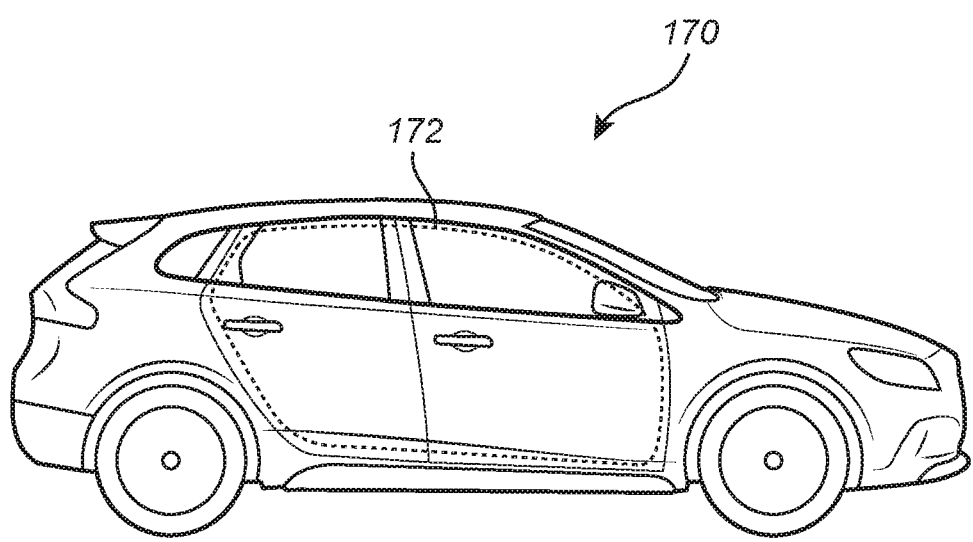
FIG. 17 is a diagram showing a side view of a vehicle having a passenger cabin with a row of seats in which the reconfigurable assembly of FIG. 1 can be incorporated, according to various embodiments.

FIG. 17 is a diagram illustrating a side view of a vehicle 170 having a passenger cabin 172 in which the reconfigurable assembly 10 of FIG. 1 can be incorporated. In this respect, the vehicle 170 may comprise the passenger cabin 172 having at least one row of passenger seats. Furthermore, the vehicle 170 may also include a base member (e.g., base member 16) fixed within one row of the at least one row of passenger seats in the passenger cabin 172, where the base member may have one or more attachment members (e.g., attachment members 18). The vehicle 170 may further include a seat unit (e.g., seat unit 26) including a frame having one or more attachment members adapted for removable attachment with the one or more attachment members 18 of the base member 16. The vehicle may also include a console unit (e.g., console unit 34, 50, 110, 130, or 150) including a frame having one or more attachment members adapted for removable attachment with the one or more attachment members of the base member.

Additionally, the vehicle 170 may be adapted such that the seat unit is attachable to the base member in a first mode for providing an extra passenger seat in the one row of passenger seats and the console unit is attachable to the base member in a second mode for providing a supplemental device for passengers seated in the one row of passenger seats. The row of passenger seats of the vehicle 170 may include a left seat and a right seat, whereby the base member may be fixed between the left and right seats, and the seat unit may be attachable to the base member to form a center seat between the right seat and left seat. Back portions of the right seat, center seat, and left seat may be adapted to be independently foldable onto a seating surface of the right seat, center seat, and left seat, respectively. Also, the vehicle 170 may be equipped with first, second, and third sets of seat belts for use by passengers in the right, center, and left seats, respectively. For example, the row of passenger seats where the reconfigurable assembly is located may be positioned in a back seat area of a sedan or in a second row or a more rearwardly positioned row of seats in a back area of a van, minivan, bus, recreational vehicle, camper, or other large vehicle.

Although the present invention is illustrated and described herein with reference to preferred embodiments and specific examples thereof, it will be readily apparent to those of ordinary skill in the art that other similar embodiments and examples can perform similar functions and/or achieve like results. All such equivalent or similar embodiments and examples should be considered as being within the spirit and scope of the present invention, are contemplated thereby, and are intended to be covered by the following non-limiting claims.

What is claimed is:

1. An assembly, comprising:
a base member fixed within a row of passenger seats of a vehicle, the base member having an attachment member;
a seat unit including a frame having an attachment member adapted for removable attachment with the attachment member of the base member; and
a console unit including a frame having an attachment member adapted for removable attachment with the attachment member of the base member;
wherein:
the attachment member of the base member includes a protuberance having outer surface dimensions;
the attachment member of the seat unit includes a first opening having inner surface dimensions substantially corresponding to the outer surface dimensions of the protuberance and adapted for a press-fit connection with the protuberance; and
the attachment member of the console unit includes a second opening having inner surface dimensions substantially corresponding to the outer surface dimensions of the protuberance and adapted for a press-fit connection with the protuberance.

2. The assembly of claim 1, wherein the seat unit is adapted to be used by a passenger as a lap tray, and wherein the first set of openings are adapted to be used as a cup or bottle holder.

3. The assembly of claim 1, wherein:
the attachment member of the base member further includes a screw hole, screw, latch, fastener, snap, buckle, hook, clip, connector, or lock;
the attachment member of the seat unit further includes a screw hole, screw, latch, fastener, snap, buckle, hook, clip, connector, or lock corresponding to the screw hole, screw, latch, fastener, snap, buckle, hook, clip, connector, or lock of the attachment member of the base member; and
the attachment member of the console unit further includes a screw hole, screw, latch, fastener, snap, buckle, hook, clip, connector, or lock corresponding to the screw hole, screw, latch, fastener, snap, buckle, hook, clip, connector, or lock of the attachment member of the base member.

4. The assembly of claim 1, wherein the console unit includes at least one of an arm rest, a storage compartment, a beverage holder, and a waste compartment.

5. The assembly of claim 1, wherein the base member further includes an electrical receptacle and the console unit includes an electrical plug adapted for electrical connection with electrical receptacle of the base member.

6. The assembly of claim 5, wherein the console unit includes at least one of an electrical charging device, a voltage converting device, a digital gaming element, a heating element, a cooling element, and a lighting element.

7. The assembly of claim 5, wherein the electrical receptacle and electrical plug include an auxiliary-type socket and plug, USB socket and plug, 120V socket and two-prong plug, 120V socket and three-prong plug, or cigarette lighter socket and plug.

8. The assembly of claim 1, wherein the seat unit further includes a seat cushion connected to the frame of the seat unit.

9. The assembly of claim 1, wherein the frame of the console unit includes a mounting element on which an insert is mounted, the insert including a plastic material, an inner surface having a felt material, and a washable fabric material.

10. The assembly of claim 9, wherein the console unit further includes a trim attached to an upper surface of the mounting element and a cover allowing access to an inside of the insert.

11. The assembly of claim 9, wherein the insert includes a cup or bottle holder having a removable cup-liner insert.

12. A vehicle, comprising:
a passenger cabin having at least one row of passenger seats;
a base member fixed within one row of the at least one row of passenger seats, the base member having an attachment member;
a seat unit including a frame having an attachment member adapted for removable attachment with the attachment member of the base member; and
a console unit including a frame having an attachment member adapted for removable attachment with the attachment member of the base member;
wherein:
the attachment member of the base member includes a protuberance having outer surface dimensions;
the attachment member of the seat unit includes a first opening having inner surface dimensions substantially corresponding to the outer surface dimensions of the protuberance and adapted for a press-fit connection with the protuberance; and
the attachment member of the console unit includes a second opening having inner surface dimensions substantially corresponding to the outer surface dimensions of the protuberance and adapted for a press-fit connection with the protuberance.

13. The vehicle of claim 12, wherein the seat unit is attachable to the base member in a first mode for providing an extra passenger seat in the one row of passenger seats and the console unit is attachable to the base member in a second mode for providing a supplemental device for passengers seated in the one row of passenger seats.

14. The vehicle of claim 13, wherein the one row of passenger seats includes a left seat and a right seat, and wherein the base member is fixed between the left and right seats.

15. The vehicle of claim 14, wherein the seat unit is attachable to the base member to form a center seat between the right seat and left seat.

16. The vehicle of claim 15, wherein back portions of the right seat, center seat, and left seat are independently foldable onto a seating surface of the right seat, center seat, and left seat, respectively.

17. The vehicle of claim 12, wherein the one row of passenger seats is positioned in a back seat area of a sedan or in a second or more rearwardly positioned row of seats of a minivan, van, bus, recreational vehicle, or camper.

18. The vehicle of claim 12, wherein the base member, seat unit, and console unit form an assembly enabling attachment of the seat unit or console unit with the base member.

19. A seat assembly, comprising:
a row of passenger seats of a vehicle including a left seat and a right seat;
a base member fixed between the left seat and the right seat of the row of passenger seats, the base member having an attachment member;
a seat unit including a frame having an attachment member adapted for removable attachment with the attachment member of the base member; and
a console unit including a frame having an attachment member adapted for removable attachment with the attachment member of the base member;
wherein:
the attachment member of the base member includes a protuberance having outer surface dimensions;
the attachment member of the seat unit includes a first opening having inner surface dimensions substantially corresponding to the outer surface dimensions of the protuberance and adapted for a press-fit connection with the protuberance; and
the attachment member of the console unit includes a second opening having inner surface dimensions substantially corresponding to the outer surface dimensions of the protuberance and adapted for a press-fit connection with the protuberance.

* * * * *